Aug. 30, 1932.  W. C. CARTER  1,874,443
FLOAT MECHANISM FOR CARBURETORS
Filed June 11, 1930
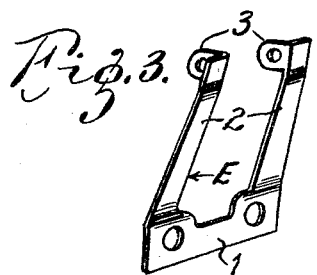
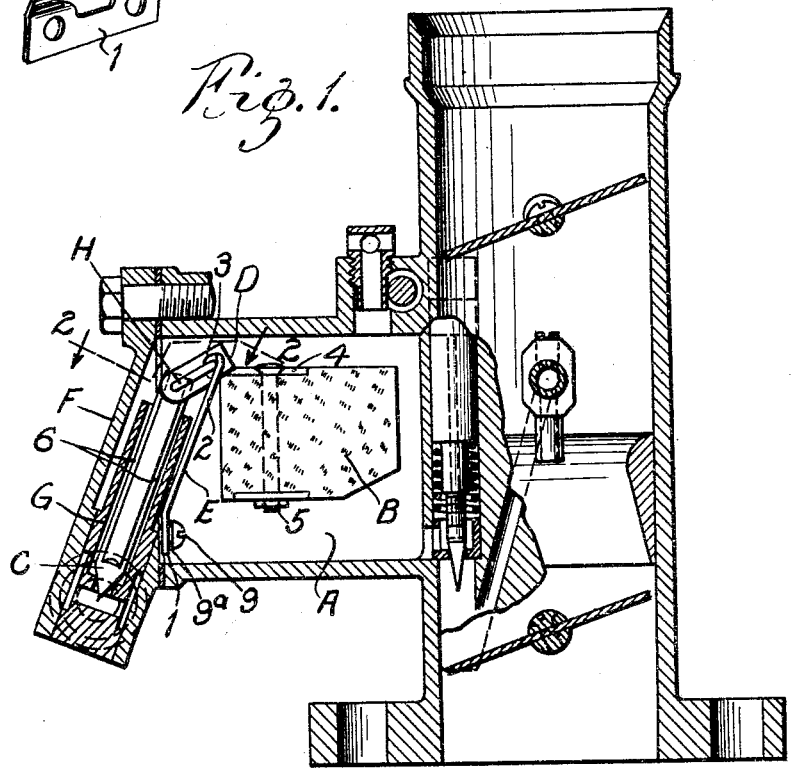
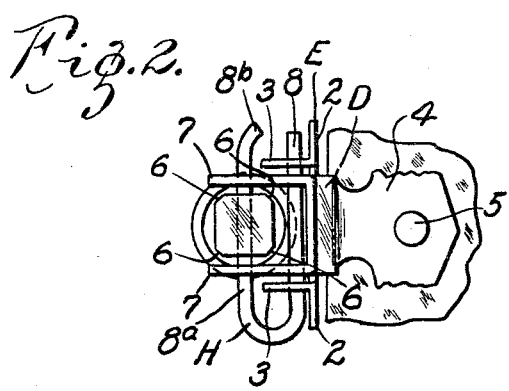
INVENTOR:
WILLIAM C. CARTER
BY Bakewell & Church
ATTORNEYS.

Patented Aug. 30, 1932

1,874,443

UNITED STATES PATENT OFFICE

WILLIAM C. CARTER, OF FLINT, MICHIGAN

FLOAT MECHANISM FOR CARBURETORS

Application filed June 11, 1930. Serial No. 460,372.

This invention relates to float mechanisms for carburetors.

The main object of the invention is to provide an inexpensive float mechanism of simple design that is particularly adapted for use with carburetors to which fuel is supplied by a pump.

Another object is to provide a float mechanism which is of such design that a relatively small, light weight float may be used to operate the means that holds the inlet valve of the float chamber seated, notwithstanding the fact that the inlet valve is subjected to a relatively great pressure tending to unseat it when the fuel consumption of the engine supplied by the carburetor is relatively low.

And still another object of my invention is to provide a float mechanism for carburetors, in which the entire mechanism consisting of the float, the inlet valve and the means for transmitting movement from the float to the inlet valve is carried by a removable wall or portion of the float chamber that can be easily taken off when it becomes necessary to repair or inspect the float mechanism. Other objects and desirable features of my invention will be hereinafter pointed out.

In the accompanying drawing which illustrates the preferred form of my invention, Figure 1 is a vertical longitudinal sectional view of a carburetor equipped with a float mechanism embodying my present invention.

Figure 2 is a fragmentary top plan view of the float and the means for transmitting movement from the float to the inlet valve, taken on the line 2—2 of Figure 1, looking in the direction indicated by the arrow; and Figure 3 is a perspective view of the support on the removable end wall of the float chamber on which the float arm is pivotally mounted.

In the drawing, A designates the float chamber of the carburetor, B designates a float in said chamber that rises and falls as the level of the fuel in said float chamber varies, due to a variation in the fuel consumption of the engine supplied by the carburetor, C designates the inlet valve, preferably a needle valve, that controls the admission of fuel to the float chamber from a source of supply, D designates a rigid arm on the float B pivotally connected to the upper end of the needle valve C and disposed in such relation with the float and with the needle valve that said arm and the shank of the needle valve C virtually form a toggle, and E designates a support on which the float arm D is rockably mounted.

The float chamber A has a removable portion, preferably a removable end wall F that is provided with a guide G for the needle valve, which guide is disposed at a slight angle to the vertical. The support E previously referred to is carried by the end wall F and said support is also disposed at a slight angle to the vertical. The arm D on the float is rigidly attached to the float adjacent the upper end of same and projects laterally and downwardly from the top side of the float. Hence, when the parts above described are assembled, as shown in Figure 1, the rigid arm D on the float and the straight shank of the needle valve C to which said arm is pivotally connected, virtually form a toggle that tends to straighten out when the float B moves upwardly, thus causing the needle valve to be forced against its seat and held seated by a pressure which is great enough to successfully withstand the relatively high pressure that exists in the supply line of the float chamber when a mechanically-operated pump or similar means is employed to feed fuel to the float chamber from a source of supply. When the level of the fuel in the float chamber drops the downward movement of the float not only breaks or collapses the toggle, but it also bodily shifts the needle valve away from its seat, thereby causing the needle valve to move rapidly relatively to its seat, with the result that the incoming fuel can flow freely into the float chamber, due to the fact that the inlet orifice is wide open and not restricted by the needle valve. Likewise, an upward movement of the float B quickly moves the needle valve C towards or into engagement with its seat, and thereafter, as the float continues to rise, the rigid arm D on the float moves into a different angular relationship with the shank of the needle valve and exerts sufficient pressure on the needle valve to hold it firmly seated, notwithstanding the fact that the fuel supply line to the float chamber is under a relatively high pressure tending to unseat the needle valve when the engine is drawing fuel from the carburetor at a relatively slow rate.

The support E preferably consists of a sheet metal stamping provided with a base 1 that has two upwardly-projecting, spaced arms 2 provided with laterally-projecting, integral ears 3 that are perforated, as shown in Figure 3, so as to receive the pivot that joins the float arm D to the support E. The float arm D also preferably consists of a sheet metal stamping of substantially U-shape in general outline, as shown in Figure 2, and provided with a base portion 4 that is attached to the float B by a rivet or other suitable device 5. The needle valve guide G is of cylindrical shape in cross section, and the needle valve C is preferably provided with a substantially square shank whose corners are beveled at 6, as shown in Figure 2, so that said shank will fit freely in the guide G. The float arm D is provided with side pieces 7 (see Figure 2) that embrace the upper end portion of the shank of the needle valve C, and said side pieces are arranged between the laterally-projecting lugs 3 on the support E. Any suitable means may be used to pivotally connect the float arm D to the support E and to pivotally connect the side pieces of said arm to the shank of the needle valve, but I prefer to use a substantially U-shaped device H, as shown in Figure 2, one of whose legs 8 extends transversely through the lugs 3 of the support and through the side pieces 7 of the float arm D and whose other leg 8ª extends transversely through the side pieces 7 of the float arm and through a hole in the upper end of the shank of the needle valve. After the connecting member H has been passed transversely through the parts which it joins together, the terminal portion of the leg 8ª of said connecting member is bent laterally at 8ᵇ, as shown in Figure 2, so as to retain said member in operative engagement with the parts which it joins together.

Due to the fact that the laterally-projecting, downwardly inclined arm D on the float rocks on a horizontal axis, there would be a tendency for the needle valve to bind in its guide G, if the support E were rigidly attached to the part that carries same. Accordingly, I mount the support E on the removable end wall F of the float chamber in such a way that said support is capable of vibrating slightly or rocking sufficiently to accommodate the arc through which the float arm D swings when the float rises and falls, and thus prevent the needle valve from binding in its guide. In the form of my invention herein shown the support E is held in position by screws or other suitable fastening devices 9 that pass through the base piece 1 of the support and are threaded into the removable end wall F of the float chamber, the heads of said screws being spaced far enough away from the end wall F to form a gap or space, indicated by the reference character 9ª in Figure 1, in which the base portion 1 of the support E can rock, and thus permit the upper end portion of the support E to swing in a direction to prevent the needle valve from binding in its guide.

A float mechanism of the construction above described can be manufactured cheaply, the parts of same can be quickly assembled and disassembled, and as the entire float mechanism, including the float and the means for transmitting movement from the float to the needle valve, is carried by a portion F of the float chamber that is capable of being removed, it is a very simple matter to install the float mechanism or remove said mechanism for inspection or repair. The float B may be of any preferred form or construction, but one advantage of a float mechanism of the kind above described is that it permits the use of a relatively small inexpensive float formed from a piece of cork. The main advantage of my float mechanism, however, is that it will securely hold the needle valve seated, even though the needle valve is subjected to a considerable pressure tending to open it, and it insures the needle valve moving quickly into a position to permit the incoming fuel to flow freely into the float chamber when the float moves in a direction to open the needle valve.

Having thus described my invention, what I claim as new and desire to secure by Letters Patent is:

1. A float mechanism for carburetors, comprising a float chamber, a float in said chamber that is adapted to rise and fall as the level of the fuel in said chamber varies, a relatively long needle valve for governing the admission of fuel to said chamber, arranged at one side of said float and disposed at a slight angle to the vertical, a long inclined guide in which said needle valve is reciprocatingly mounted, a rigid arm on said float that projects laterally and downwardly from the upper end of same, a pivotal connection between said arm and the upper end of said needle valve, a support projecting upwardly from the lower end of the float chamber and provided at its upper end with a fulcrum for the float arm, and a connection between the lower end of said support and the part of the float chamber that carries said support, constructed so as to permit the upper end of the support to move sufficiently to accommodate the arc through which the float arm swings when the float rises and falls.

2. A carburetor of the kind described in claim 1, in which the float chamber is provided with a removable upright wall that carries the needle valve guide and the support on which the float arm is fulcrumed.

WILLIAM C. CARTER.